United States Patent
Shanmugaraj

(10) Patent No.: US 11,199,854 B2
(45) Date of Patent: Dec. 14, 2021

(54) VEHICLE CONTROL SYSTEM, APPARATUS FOR CLASSIFYING MARKINGS, AND METHOD THEREOF

(71) Applicant: MANDO CORPORATION, Gyeonggi-do (KR)

(72) Inventor: M Shanmugaraj, Bangalore (IN)

(73) Assignee: MANDO CORPORATION, Gyeonggi-Do (KR)

( * ) Notice: Subject to any disclaimer, the term of this patent is extended or adjusted under 35 U.S.C. 154(b) by 375 days.

(21) Appl. No.: 16/509,459

(22) Filed: Jul. 11, 2019

(65) Prior Publication Data

US 2020/0341484 A1 Oct. 29, 2020

(30) Foreign Application Priority Data

Apr. 26, 2019 (KR) .................... 10-2019-0049108

(51) Int. Cl.
*G05D 1/02* (2020.01)
*G06K 9/00* (2006.01)
*G06T 7/90* (2017.01)

(52) U.S. Cl.
CPC ....... *G05D 1/0246* (2013.01); *G06K 9/00798* (2013.01); *G06T 7/90* (2017.01); *G05D 2201/0213* (2013.01); *G06T 2207/30256* (2013.01)

(58) Field of Classification Search
CPC .......... G05D 1/0246; G05D 2201/0213; G06T 7/90; G06T 2207/30256; G06K 9/00798
USPC ......................................... 701/23
See application file for complete search history.

(56) References Cited

U.S. PATENT DOCUMENTS

| | | | | |
|---|---|---|---|---|
| 2009/0088978 | A1* | 4/2009 | Ishikawa | G08G 1/096725 701/514 |
| 2015/0178572 | A1* | 6/2015 | Omer | G08G 1/0141 382/108 |
| 2016/0129840 | A1* | 5/2016 | Schofield | G08G 1/163 348/148 |

* cited by examiner

Primary Examiner — Gertrude Arthur Jeanglaude
(74) Attorney, Agent, or Firm — Ladas & Parry, LLP

(57) ABSTRACT

Disclosed are a vehicle control system, a marking classifying device, and a marking classifying method. Specifically, a vehicle control system according to the present disclosure may include: a camera mounted to a vehicle so as to have a field of view inside or outside the vehicle and configured to capture image data; a communication module configured to receive GPS signals from GPS satellites; a marking classifying device configured to classify and store types of markings provided on a road based on the image data and the GPS signals; and a control device configured to detect a marking on a road on which the vehicle is travelling based on the image data, identify a type of the detected marking based on the type of marking stored in the marking classifying device, and generate and output a control signal for controlling the driving of the vehicle based on the identified type of the marking.

11 Claims, 8 Drawing Sheets

FIG.6

| Lane markings(Lane) | | Road markings(Road Marking) | |
|---|---|---|---|
| Single line (Single) | White | Stop (Stop) | STOP |
| Dashed line (Dashed) | White | Go slow (Going Slow) | SLOW |
| Double line (Double) | White | Turn left (Left) | ↰ |
| Zigzag line (Zigzag) | White | Turn right (Right) | ↱ |
| Single line (Single) | Yellow | Go straight (Straight) | ⇧ |
| ⋮ | ⋮ | ⋮ | ⋮ |

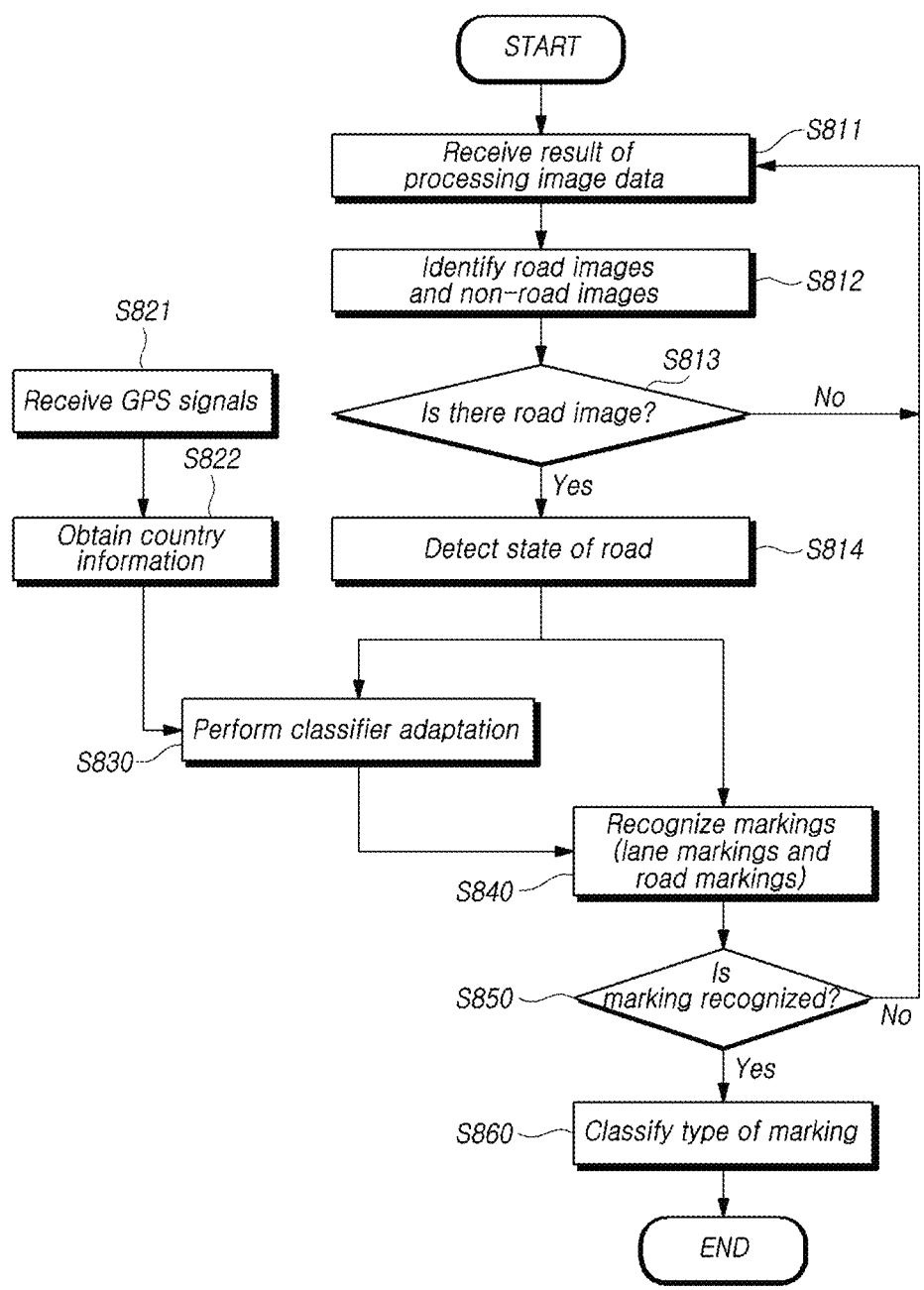

VEHICLE CONTROL SYSTEM, APPARATUS FOR CLASSIFYING MARKINGS, AND METHOD THEREOF

CROSS REFERENCE TO RELATED APPLICATION

This application claims priority from Korean Patent Application No. 10-2019-0049108, filed on Apr. 26, 2019, which is hereby incorporated by reference for all purposes as if fully set forth herein.

BACKGROUND OF THE INVENTION

1. Field of the Invention

The present disclosure relates to a vehicle control system, a marking classifying device, and a marking classifying method.

2. Description of the Prior Art

Recently, along with remarkable advances in information processing and communication technology, there have been many cases in which map data is constructed using geospatial information and is used in transportation-related fields such as the production of a navigation map, driving safety, autonomous navigation, and the like.

In particular, such map data is produced based on information on actual captured images and the like. Since the above-described map data changes when new roads are constructed, traffic systems are changed, and the like, it is necessary to update the map data.

In general, the update of the map data is performed manually. In this regard, since the markings displayed on the road for providing vehicles with information for driving, such as lanes, traveling directions, a no-entry sign, and the like, constantly change, an operator must check the same one by one, or a manager must search for marking information one by one in order to perform an update, which may be bothersome.

In addition, if a vehicle fails to update the map data in time, a control device provided in the vehicle cannot correctly recognize the changed markings, whereby control of the vehicle may be faulty.

SUMMARY OF THE INVENTION

In this background, the present disclosure provides a vehicle control system, a marking classifying device, and a marking classifying method, which can accurately recognize markings displayed on the road on which a vehicle is travelling, and can appropriately control the driving of the vehicle according to the recognized markings.

In addition, the present disclosure provides a vehicle control system, a marking classifying device, and a marking classifying method, which can correctly recognize markings that are specified differently between countries, thereby appropriately accelerating or braking the vehicle.

In order to solve the above problems, the present disclosure according to an aspect provides a marking classifying device including: a road detector configured to receive image data to detect a road; a classifier selector configured to receive GPS signals to extract country information or region information and configured to select a classifier corresponding to the country information or the region information from among a plurality of classifiers; and a marking classifier configured to recognize a marking provided on the detected road and configured to classify the type of the recognized marking using the selected classifier, According to another aspect, the present disclosure provides a marking classifying method including: a road detection step of receiving image data and detecting a road; a classifier selection step of receiving GPS signals to extract country information or region information and selecting a classifier corresponding to the country information or the region information from among a plurality of classifiers; and a marking classification step of recognizing a marking provided on the detected road and classifying the type of the recognized marking using the selected classifier.

According to another aspect, the present disclosure provides a vehicle control system including: an image sensor mounted to a vehicle so as to have a field of view inside or outside the vehicle and configured to capture image data; a communication module configured to receive GPS signals from GPS satellites; a marking classifying device configured to classify and store the types of markings provided on a road based on the image data and the GPS signals; and a control device configured to detect a marking on the road on which the vehicle is travelling based on the image data, identify the type of the detected marking based on the types of markings stored in the marking classifying device, generate a control signal for controlling the driving of the vehicle based on the identified type of the marking, and output the control signal to an actuator, wherein the marking classifying device is configured to: receive the image data to detect the road; receive the GPS signals to extract country information or region information; select a classifier corresponding to the country information or the region information from among a plurality of classifiers; recognize a marking provided on the detected road; and classify the type of the recognized marking using the selected classifier.

As described above, according to the present disclosure, the present disclosure can provide a vehicle control system, a marking classifying device, and a marking classifying method, which can accurately recognize markings displayed on the road on which a vehicle is travelling, and can appropriately control the driving of the vehicle according to the recognized markings.

In addition, according to the present disclosure, the present disclosure can provide a vehicle control system, a marking classifying device, and a marking classifying method, which can correctly recognize markings that are specified differently between countries, thereby appropriately accelerating or braking the vehicle.

BRIEF DESCRIPTION OF THE DRAWINGS

The above and other aspects, features, and advantages of the present disclosure will be more apparent from the following detailed description taken in conjunction with the accompanying drawings, in which:

FIG. 6 is a diagram illustrating an example of a data set for the types of markings according to the present disclosure;

FIG. 8 is a flowchart illustrating a marking classifying method in detail according to the present disclosure.

DETAILED DESCRIPTION OF THE EXEMPLARY EMBODIMENTS

Figure 1:
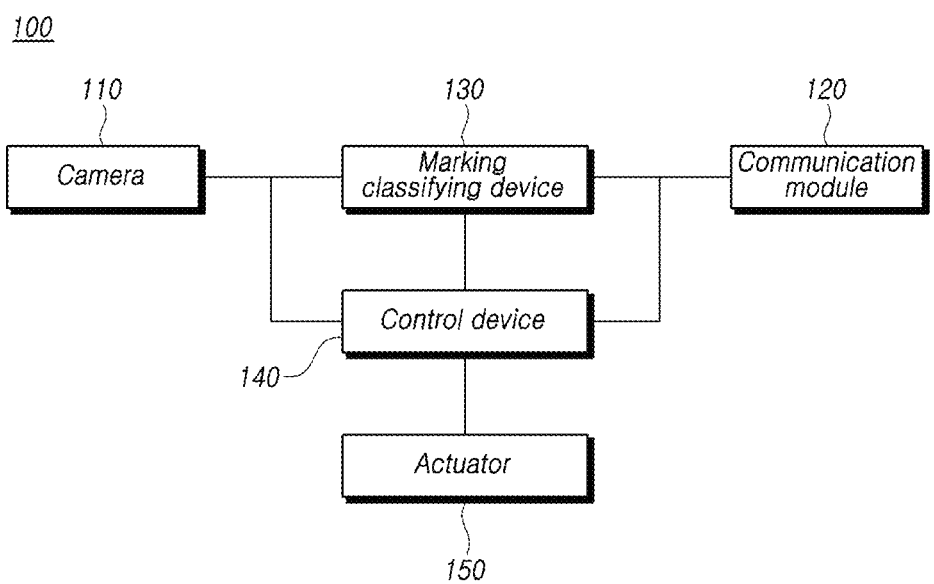
FIG. 1 is a block diagram illustrating a vehicle control system according to the present disclosure.

In the following description of examples or embodiments, reference will be made to the accompanying drawings in which it is shown by way of illustration specific examples or embodiments that can be implemented, and in which the same reference numerals and signs can be used to designate the same or like components even when they are shown in different accompanying drawings from one another.

Further, in the following description of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a vehicle control system 100 according to the present disclosure.

Referring to FIG. 1, a vehicle control system 100 according to the present disclosure may include an image sensor 110, a communication module 120, a marking classifying device 130, a control device 140, and an actuator 150.

The image sensor 110 may be mounted to a vehicle so as to have a field of view inside or outside of the vehicle, and may then capture image data thereon.

Since information on images photographed by the image sensor 110 includes image data, the image information may be image data captured by the image sensor 110. Hereinafter, "captured image data" means the image information photographed by the image sensor 110 in the present disclosure. The captured image data may be generated in a raw-data format such as AVI, MPEG-4, H.264, DivX, JPEG, or the like. However, the present disclosure is not limited thereto.

The image sensor 110 may be a camera. The camera may be, for example, a fisheye lens camera. The fisheye lens camera may refer to a camera employing a lens having an angle of view of 180 degrees, which is wider than that of a wide-angle lens. Hereinafter, the present disclosure will be described on the assumption that the image sensor 110 is a camera. However, the present disclosure the present disclosure is not limited thereto.

The communication module 120 may perform functions of vehicle-to-vehicle communication, vehicle-to-infrastructure communication, vehicle-to-server communication, in-vehicle communication, and the like. To this end, the communication module 120 may include a transmission module and a reception module. For example, the communication module 120 may include a broadcast reception module, a wireless Internet module, a short-range commission module, a location information module, an optical communication module, a V2X communication module, and the like.

The broadcast reception module may receive broadcast signals or broadcast-related information from an external broadcast management server through a broadcast channel. Here, the broadcast may include at least one of a radio broadcast or a TV broadcast.

The wireless Internet module refers to a module for wireless Internet access, which may be embedded in the vehicle, or may be provided separately from the vehicle.

The short-range communication module is intended for short-range communication, and may support short-range communication using at least one of Bluetooth™, Radio Frequency Identification (RFID), Infrared Data Association (IrDA), Ultra-Wide Band (UWB), ZigBee, Near-Field Communication (NFC), Wireless-Fidelity (Wi-Fi), Wi-Fi Direct, or Wireless Universal Serial Bus (Wireless USB).

The location information module is a module for acquiring location information of a vehicle, and a representative example thereof may be a GPS (Global Positioning System) module. For example, utilizing the GPS module, the vehicle may receive GPS signals transmitted from GPS satellites, and may acquire information on the location of the vehicle, a region code, a country code, and the like using the GPS signals.

Here, the region code or the country code may be a code determined to specify the region or the country. By decoding the region code or the country code, information about the region or country may be obtained.

Meanwhile, according to the embodiment of the present disclosure, the location information module may be a component included in the control device 140, instead of being included in the communication module 120.

The optical communication module may include an optical transmitter and an optical receiver. The optical transmitter and the optical receiver may convert light signals into electrical signals to transmit and receive information.

The V2X communication module may refer to a module for performing wireless communication with a server, another vehicle, an infrastructure device, and the like. The V2X communication module in the present embodiment may mean an exchange of information between the vehicle and objects, such as other vehicles, mobile devices, roads, or the like, through a wired or wireless network, or may mean a technique therefor. The V2X communication module may support V2V (Vehicle-to-Vehicle) communication, V2I (Vehicle-to-Infrastructure) communication, V2N (Vehicle-to-Nomadic Device) communication, V2P (Vehicle-to-Pedestrian) communication, and so on. The V2X communication module is based on Dedicated Short-Range Communications (DSRC), and may use, but is not limited to, a Wireless Access in Vehicular Environment (WAVE) recently processed in Institute of Electrical and Electronics Engineers (IEEE) or IEEE 802.11p communication using a 5.9 GHz band. It should be understood that the V2X communication module is able to support all inter-vehicle communications that are currently being developed or will be developed in the future.

The marking classifying device 130 may classify and store the types of markings provided on the road based on image data and GPS signals.

Specifically, the marking classifying device 130 may receive image data, may separate and detect the image corresponding to a road on which the vehicle is travelling, among a plurality of images included in the image data, from the images corresponding to other objects (e.g., buildings, guard rails, pedestrians, other vehicles, etc.), may extract the images corresponding to markings in the image of the road (e.g., markings such as "STOP", "SLOW", and the like), and may classify the same according to the type of marking through machine learning.

Meanwhile, since commonly used markings or signs are different between countries and regions, a classifier corresponding to a country or region is required in order to accurately classify a specific type of marking.

Thus, the marking classifying device 130 may receive GPS signals, may extract country code or region code from the GPS signals, may select a classifier corresponding to the extracted country code or region code, and may use the selected classifier for machine learning.

Here, the machine learning may include deep learning using a Convolutional Neural Network (CNN) or Deep Neural Network (DNN), Tensor Flow, Support Vector Machine (SVM), and the like. However, the machine learning is not limited thereto.

The marking classifying device 130 may further include a storage device, such as a memory, and the marking classifying device 130 including the storage device may store the markings classified into categories, marking information corresponding to the types of the markings, and the like.

The marking classifying device 130 may generate a signal including the previously stored marking information in response to a request signal output by the control device 140, and may output the signal to the control device 140.

The marking information stored in the marking classifying device 130 may be generated, updated, and stored while the vehicle including the vehicle control system 100 according to the present disclosure is travelling.

Here, the markings provided on the road may be intended to appropriately guide the travelling of the vehicle by, for example, providing the directional information to the vehicle or instructing the vehicle to reduce the speed thereof.

For example, the markings provided on the roads include various kinds of lane markings, road markings, and the like. However, the markings are not limited thereto, and may further include signboards installed on the edge of the road or infrastructure for guiding the travelling of the vehicle.

The marking classifying device 130 may include one or more processors for performing the above-described operations, or may include modules or means for performing specific operations. The marking classifying device 130 will be described in detail later.

The control device 140 may detect markings provided on the road on which the vehicle travels based on image data, may identify the type of the detected marking based on marking information stored in the marking classifying device 130, may generate a control signal based on the identified type of the marking, and may output a control signal to the actuator 150 so as to control the travel of the vehicle.

Specifically, the control device 140 detects a marking on the road from the image data. Then, the control device 140 outputs a control signal to the marking classifying device 130 and receives a signal from the marking classifying device 130. Thereafter, the control device 140 compares the type of marking indicated by the input signal with the detected marking, thereby determining the type of the detected marking. According to the identified type of the marking, the control device 140 may generate a control signal for determining the travelling direction of the vehicle or adjusting the speed of the vehicle, and may output the same to the actuators 150.

Here, the control device 140 may further receive location information of the identified vehicle by the communication module in order to more accurately recognize the type of the detected marking or more accurately control the driving of the vehicle.

The actuator 150 may be a device for receiving a control signal from the control device 140 and driving according thereto. Here, the actuator 150 may include, for example, a driving motor, an alarm device, a steering device, and the like.

Respective components included in the vehicle control system 100 according to the present disclosure may input or receive signals using a controller area network, which is in-vehicle communication.

Although not shown, the vehicle control system 100 according to the present disclosure may further include a non-image sensor including a radar sensor, a lidar sensor, an ultrasonic sensor, and the like, and internal vehicle sensors including a torque sensor for sensing a steering torque, a steering angle sensor for sensing a steering angle, a motor position sensor for sensing information about a steering motor, a vehicle speed sensor, a vehicle motion sensor for sensing the motion of the vehicle, a vehicle posture sensor, and the like.

According to the present disclosure, the vehicle control system 100 according to the present disclosure provides the effect of accurately recognizing the markings displayed on the road on which the vehicle is travelling and appropriately controlling the travel of the vehicle according to the recognized markings.

Hereinafter, the operation of the vehicle control system 100 will be described in detail in terms of signal input and output based on the marking classifying device 130.

Figure 2:
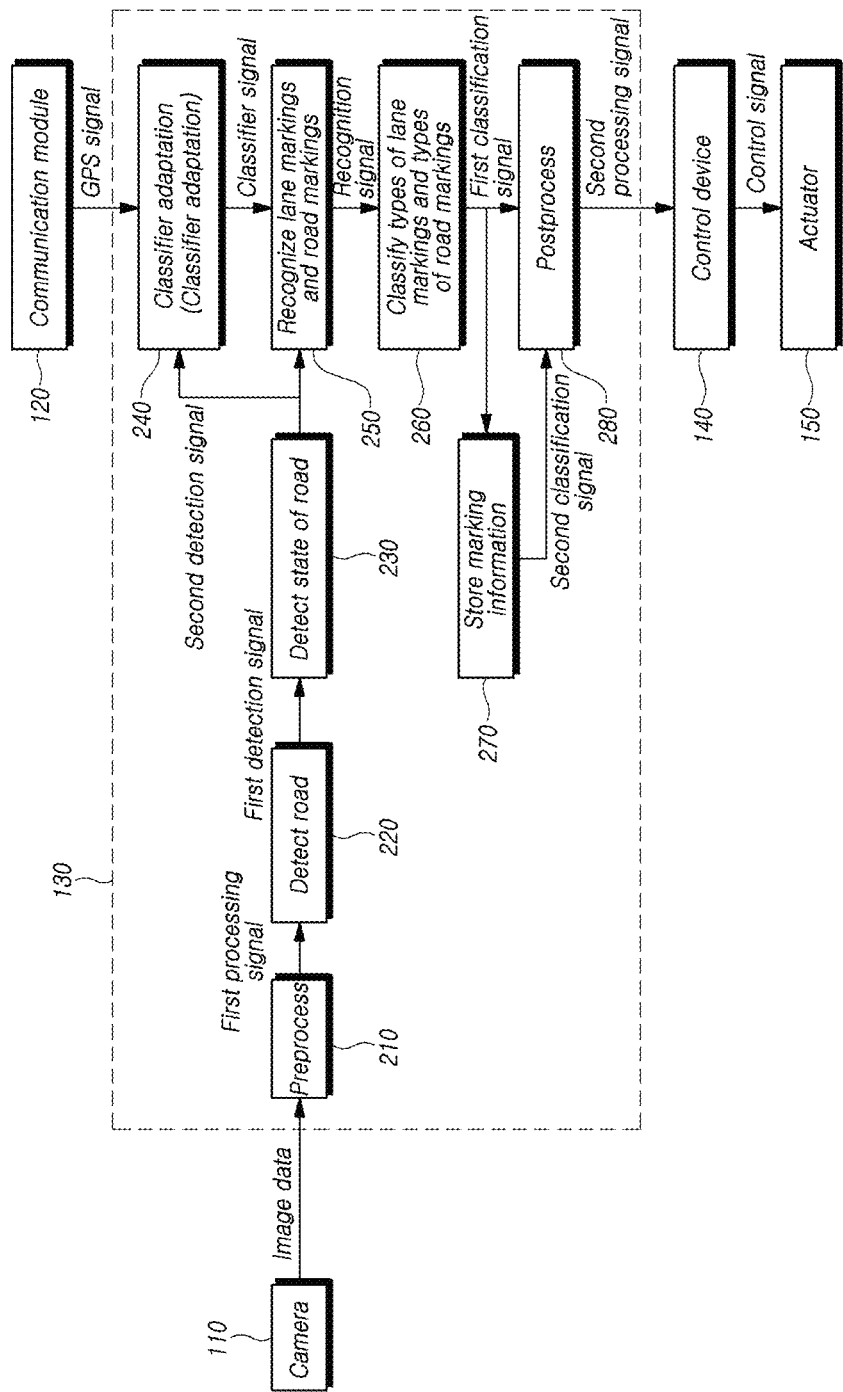
FIG. 2 is a diagram illustrating the flow of input and output signals in a vehicle control system according to the present disclosure.

FIG. 2 is a diagram illustrating the flow of input and output signals in a vehicle control system 100 according to the present disclosure.

Referring to FIG. 2, the image sensor 110 according to the present disclosure may output, to the marking classifying device 130, image data obtained by detecting and capturing the surroundings of the vehicle.

A pre-processor 210 included in the marking classifying device 130 may receive the image data from the image sensor 110, and may preprocess the same.

For example, the pre-processor 210 adjusts the brightness, contrast, and the like of the received image data or may perform correction to stretch convexly distorted portions of the image data.

When the preprocessing is performed, the pre-processor 210 may generate a first processing signal, and may output the same to a road detection processor 220 included in the marking classifying device 130.

Here, the first processing signal may refer to a signal corresponding to the preprocessed image data.

Meanwhile, the preprocessed image data may include images of a road, buildings, guard rails, other vehicles, and the like.

The road detection processor 220 may receive the first processing signal, and may detect the road from the preprocessed image data indicated by the first processing signal.

For example, the road detection processor 220 detects the image of a road from among the images of various objects (e.g., buildings, infrastructure, other vehicles, etc.) contained in the preprocessed image data.

When the road is detected, the road detection processor 220 generates a first detection signal and outputs the same to a state detection processor 230 included in the marking classifying device 130.

Here, the first detection signal may be a signal corresponding to the image of the road detected from the preprocessed image data, road information, and the like.

The state detection processor 230 may receive the first detection signal, and may detect the state of the road based on the road indicated by the first detection signal.

Here, the state of the road may include, but is not limited to, cracks in the road, the degree of aging of the road, materials of the road, and snow, water, sand, and the like, which exist on the surface of the road.

If the state of the road is detected, the state detection processor 230 may output a second detection signal to a classifier adaptation processor 240 and a marking recognition processor 250, respectively.

Here, the second detection signal may refer to a signal that further includes information on the state of the road in addition to the first detection signal.

Meanwhile, the commission module 120 according to the present disclosure may receive GPS signals from GPS satellites. The communication module 120 may output the received GPS signals to the classifier adaptation processor 240.

The classifier adaptation processor 240 may receive the received GPS signals, may extract country information or region information therefrom, and may perform classifier adaptation so as to select a classifier corresponding to the extracted country information or region information.

Here, the country information may include information on the code indicating a specific country, and the region information may include information on the code indicating a specific region. In addition, the classifier adaptation may be selection of a classifier corresponding to the country code or the region code.

Since lane markings or road markings are specified to be different between countries or regions, the classifier is selected from among a plurality of classifiers according to the GPS signals.

Meanwhile, the classifier selected by the classifier adaptation processor 240 merely by receiving the GPS signals may be a classifier capable of operating when the road is in an ideal state or in a state corresponding to clear weather.

However, the road is very rarely in the ideal state. Accordingly, the classifier adaptation processor 240 may select a high-performance classifier that more precisely classifies the types of markings in consideration of the state of the road.

For example, the classifier adaptation processor 240 may receive the GPS signals and the second detection signal, and may select a classifier corresponding to the country code or region code and the state of the road from among a plurality of prestored classifiers, thereby performing the classifier adaptation.

The classifier adaptation processor 240 may generate a classifier signal including classifier information about the selected classifier, and may output the same to the marking recognition processor 250.

The marking recognition processor 250 may receive the second detection signal and the classifier signal, and may recognize the markings displayed on the detected road.

Here, the markings may include, for example, lane markings such as a center line, a lane-change line, and the like, or road markings such as left turn, right turn, stop, slow, and the like.

For example, the marking recognition processor 250 recognizes lane markings and road markings in the road image using an ROI (Region Of Interest) algorithm.

If a marking is recognized, the marking recognition processor 250 may output, to the classifying processor 260, a recognition signal including information on the recognized marking and classifier information.

The classifying processor 260 may receive the recognition signal, and may classify the type of the recognized marking according to the selected classifier.

For example, if the vehicle is located in the Republic of Korea, and if the line that distinguishes between one direction road and the opposite direction road is recognized, the classifying processor 260 classifies the recognized line as a center line according to a classifier corresponding to Korea.

When the type of the marking is classified, the classifying processor 260 may output a first classification signal including marking information on the type of the marking to the marking-information storing processor 270.

Meanwhile, in the case where the vehicle control system 100 according to the present disclosure uses the classified type of the marking in order to control the current traveling of the vehicle, the classifying processor 260 may also output the first classification signal to a post-processor 280.

The marking-information storing processor 270 may receive the first classification signal, and store the marking information. Meanwhile, in order for the vehicle control system 100 according to the present disclosure to control the driving of the vehicle using the stored marking information, the marking-information storing processor 270 may generate a second classification signal including the stored marking information, and may output the same to the post-processor 280.

The post-processor 280 may receive the first classification signal or the second classification signal to postprocess the marking information, thereby generating a second processing signal including the postprocessed marking information, and may output the second processing signal to the control device 140.

For example, the post-processor 280 further detects the color of the center line of the classified lane marking, generates a second processing signal including marking information reflecting the color information, and outputs the second processing signal to the control device 140.

The control device 140 may detect a marking on the road on which the vehicle is traveling from the image data, may identify the type of the detected marking using the marking information (e.g., the type of marking and the like) indicated by the received second processing signal, and may then control the driving of the vehicle based on the identified type of the marking.

For example, the control device 140 detects a road marking displayed on the road on which the vehicle is travelling from the image data, and identifies that the detected road marking is a left-turn arrow. Then, the control device 140 generates a control signal in order for the vehicle to turn to the left according to the left-turn arrow and outputs the same to the actuator 150.

According to the above description, the vehicle control system 100 according to the present disclosure can provide the effect of appropriately accelerating or braking the vehicle by correctly recognizing markings specified to be different between countries or regions.

Hereinafter, the marking classifying device 300 according to the present disclosure will be described in more detail.

Figure 3:
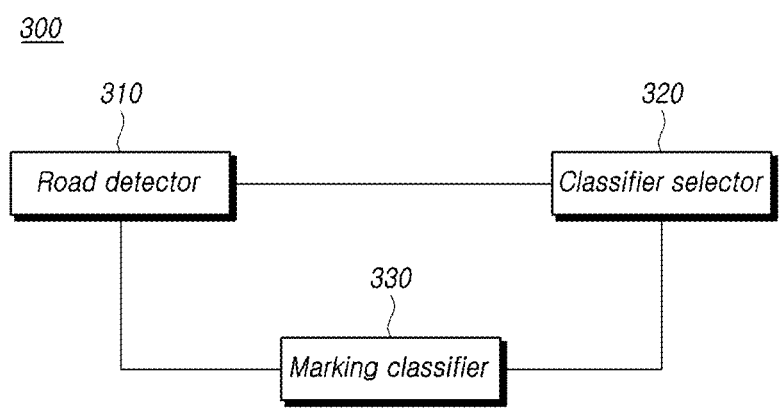
FIG. 3 is a block diagram illustrating a marking classifying device according to the present disclosure.

FIG. 3 is a block diagram illustrating a marking classifying device 300 according to the present disclosure.

Referring to FIG. 3, the marking classifying device 300 according to the present disclosure may include a road detector 310, a classifier selector 320, a marking classifier 330, and the like.

The road detector 310 may receive image data to detect a road, and may generate and output a detection signal indicating information on the detected road.

Specifically, the road detector 310 may detect the image on the road, among the respective images of various objects included in the image data, and may generate a detection signal including information on the detected images of the road, thereby outputting the same to the marking classifier 330.

Here, the road detector 310 may process the received image data to detect the state of the road, and may output state information on the detected state of the road so as to be included in the detection signal.

Specifically, the road detector 310 may preprocess the received image, may detect a road from the preprocessed image data to generate a first detection signal, may detect the state of the road based on the first detection signal, and may generate a second detection signal including information on the road and the state of the road, thereby outputting the second detection signal to the marking classifier 330.

Meanwhile, if the road detector 310 detects the state of the road, the road detector 310 may output a detection signal, which further includes the state information, to the classifier selector 320.

The road detector 310 may include the pre-processor 210, the road detection processor 220, and the state detection processor 230 shown in FIG. 2.

The classifier selector 320 may extract country information or region information from received GPS signals, may select a classifier corresponding to the country information or the region information from among a plurality of classifiers, and may generate and output a classifier signal including classifier information about the selected classifier.

Specifically, the classifier selector 320 may extract country code (or region code) included in the country information (or region information) based on the GPS signals received by the communication module 120, may select a classifier corresponding to the country code (or the region code) from among a plurality of prestored classifiers, may generate a classifier signal including information about the selected classifier, and may the classifier signal to the marking classifier 330.

The classifier selector 320 may include the classifier adaptation processor 240 shown in FIG. 2.

The marking classifier 330 may receive a detection signal to recognize markings on the road detected from road information, may receive a classifier signal to identify classifier information, and may classify the type of the recognized marking using a classifier indicated by the classifier information.

Here, if the road detector 310 further detects the state of the road, the marking classifier 330 may identify the state of the road indicated by the state information, and if the detected state of the road corresponds to a predetermined reference detection state, the marking classifier 330 may perform an operation of recognizing the marking.

The operation of recognizing the marking only if the state of the road corresponds to a reference detection state is intended to prevent misrecognition and erroneous control.

Meanwhile, if the recognized marking is a lane marking, the marking classifier 330 may further identify the color of the lane marking, and may classify the type of the lane marking by reflecting information on the identified color.

The marking classifier 330 may include a marking recognition processor 250, a classifying processor 260, a marking-information storing processor 270, and a post-processor 280.

Although not shown, the marking classifying device 300 according to the present disclosure may further include a memory capable of storing information on the classified marking.

The marking classifying device 300 according to the present disclosure or the road detector 310, the classifier selector 320, and the marking classifier 330, which are included in the marking classifying device 300, may include a processor, a storage devices such as a memory, computer programs capable of performing specific functions, and the like. The above-described road detector 310, classifier selector 320, and marking classifier 330 may be implemented as software modules capable of performing respective unique functions.

The marking classifying device 300 according to the present embodiment may be implemented as a computer system, and the computer system may include at least one element of one or more processors, a memory, a storage device, a user interface, or input/output devices, which may communicate with each other through a bus.

In addition, the computer system may include a network interface for access to the network.

The processor may be a CPU or a semiconductor device that executes processing instructions stored in a memory and/or a storage device. The memory and the storage device may include various types of volatile/non-volatile storage media. For example, the memory may include ROM and RAM.

The marking classifying device 300 having the above hardware configuration may include software or programs for performing functions of the road detector 310, the classifier selector 320, and the marking classifier 330, which may be installed in the memory or storage device and may be executed by the processor.

Hereinafter, an embodiment of the road detector 310 included in the marking classifying device 300 according to the present disclosure will be described.

Figure 4:
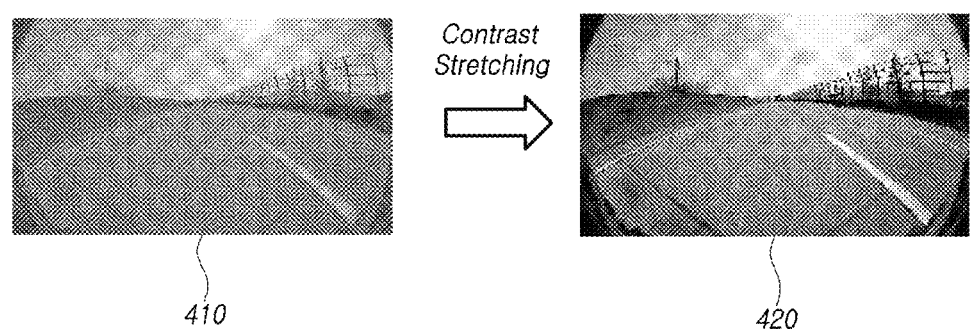
FIG. 4 is a diagram illustrating an embodiment in which a road detector processes image data according to the present disclosure.

FIG. 4 is a diagram for explaining an embodiment in which the road detector 310 processes image data according to the present disclosure.

Referring to FIG. 4, the road detector 310 may perform contrast-stretching on the received image data, thereby adjusting the contrast of the image data.

For example, if it is difficult to detect the road because the brightness of the image data is less than a reference value, the road detector 310 may increase the brightness of the received image data.

As another example, if it is difficult to detect the road because the brightness of the image data is much greater than a reference value, the road detector 310 may reduce the brightness of the received image data.

Meanwhile, in the case where the image sensor 110 shown in FIG. 1 is a fisheye lens camera, the image captured by the fisheye lens camera may have distorted portions. Thus, the road detector 310 may correct the distorted portions in the image data as a two-dimensional plane.

As described above, the present disclosure may provide the effect of preventing misrecognition by adjusting contrast of the image data.

Hereinafter, examples of the markings provided on the detected road will be described.

Figure 5:
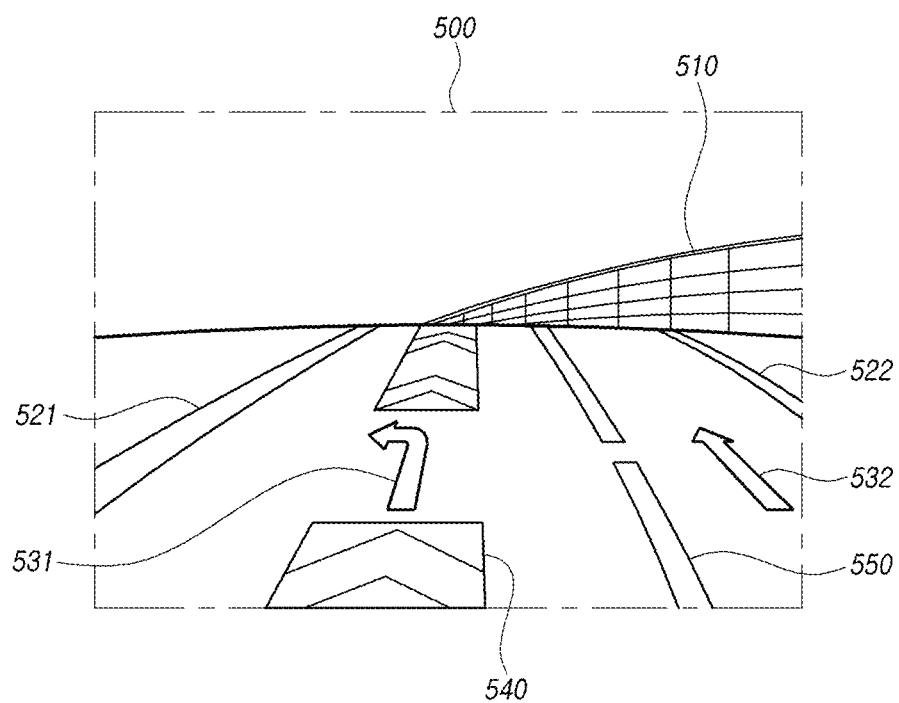
FIG. 5 is a diagram illustrating examples of markings on the road according to the present disclosure.

FIG. 5 is a diagram illustrating examples of markings provided on the road according to the present disclosure, and FIG. 6 is a diagram illustrating an example of a data set for the types of markings according to the present disclosure.

Referring to FIG. 5, an image 500 or a frame photographed by the image sensor 110 may include various kinds of objects.

For example, the image 500 may include a structure 510, a first edge line 521, a second edge line 522, a first road marking 531, a second road marking 532, a driving-assist line 540, a lane-change line 550, and the like.

Here, the marking classifying device 300 according to the present disclosure may recognize and classify the markings, excluding the structure 510, such as the first edge line 521, the second edge line 522, the first road marking 531, the second road marking 532, the driving-assist line 540, and the lane change line 550.

Information on the classified markings may be expressed as shown in FIG. 6.

Referring to FIG. 6, lane markings of the markings may be divided into a single line, a double line, a dashed line, and the like, so that respective lanes may have different driving rules associated therewith. In addition, the same lane marking may have different colors, and the driving rules may differ depending on the color of the lane marking.

Likewise, road markings of the markings may be divided into "stop", "go slow", "left turn", "right turn", and the like, which are represented by signs, and may have different driving rules associated therewith.

Since the markings may be defined differently depending on the country or region, the present disclosure is not limited to the examples shown in FIG. 6.

Hereinafter, a marking classifying method capable of performing the present disclosure will be described.

Figure 7:
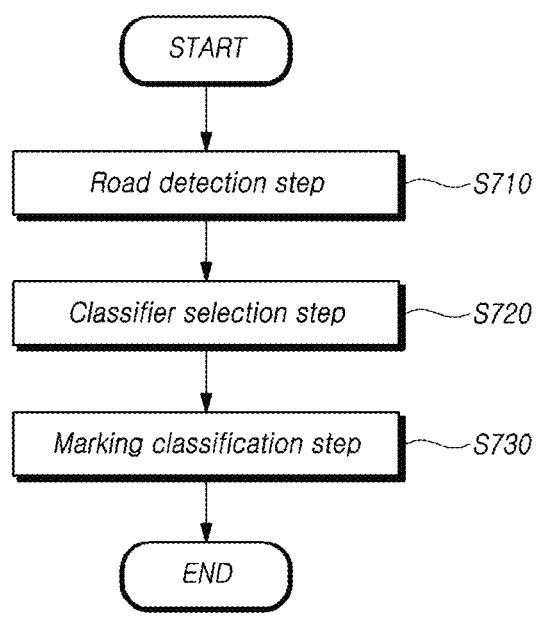
FIG. 7 is a flowchart illustrating a marking classifying method according to the present disclosure.

FIG. 7 is a flowchart illustrating a marking classifying method according to the present disclosure.

Referring to FIG. 7, a marking classifying method according to the present disclosure may include a road detection step S710, a classifier selection step S720, and a marking classification step S730.

The road detection step S710 may include operations of receiving image data to detect a road, and generating and outputting a detection signal including road information about the detected road.

Here, the road detection step S710 may include an operation of performing contrast-stretching with respect to the received image data to adjust contrast of the image data.

Meanwhile, the road detection step S710 may include operations of processing the received image data to detect the state of the road and including state information on the detected state of the road in a detection signal.

The classifier selection step S720 may include operations of receiving GPS signals to extract country information or region information, selecting a classifier corresponding to the country information or region information from among a plurality of classifiers, and generating and outputting a classifier signal including classifier information about the selected classifier.

The marking classification step S730 may include operations of receiving the detection signal to recognize a marking provided on the detected road from road information, receiving the classifier signal to identify classifier information, and classifying the type of the recognized marking using the classifier indicated by the classifier information.

If the state of the road is detected in the road detection step S710, the marking classification step S730 may include operations of identifying the state of the road indicated by the state information and, if the state of the detected road corresponds to a predetermined reference detection state, recognizing the marking.

Meanwhile, the marking classification step S730 may include operations of, if the recognized marking is a lane marking, further identifying the color of the lane marking and classifying the type of the lane marking by reflecting color information about the identified color.

Hereinafter, the marking classifying method according to the present disclosure will be described in detail.

FIG. 8 is a flowchart illustrating a marking classifying method in detail according to the present disclosure.

Referring to FIG. 8, in step S811, a result of processing image data may be received.

For example, the pre-processor 210 preprocesses the image data captured by the image sensor 110 and outputs a first processing signal including the processing result to the road detection processor 220. The road detection processor 220 receives the result of processing the image data indicated by the first processing signal.

In step S812, road images and non-road images may be identified based on the result of processing the data.

Here, the non-road images may be the images of buildings, guard rails, structures, etc., excluding the road images corresponding to the road.

For example, the road detection processor 220 may receive a first processing signal, and may identify a road image corresponding to the road and a non-road image corresponding to the structures 510 from the preprocessed image data indicated by the first processing signal.

In step S813, it may be determined whether or not there is a road image.

If there is no road image, the process returns to step S811 in which image data may be received again.

If there is a road image, the state of the road may be detected in step S814.

For example, the state detection processor 230 may detect the state of the road based on the road.

Meanwhile, GPS signals may be received in step S821. For example, the communication module 120 receives GPS signals from GPS satellites.

When the GPS signals are received, in step S821, country information (e.g., country code) or region information (e.g., region code) may be obtained based on the GPS signals.

If the country information or region information is acquired, and if the state of the road is detected, the classifier adaptation may be performed in step S830.

For example, the classifier adaptation processor 240 receives the GPS signals, extracts country information or region information therefrom, and performs classifier adaptation so as to select a classifier corresponding to the extracted country information or region information.

Then, in steps S840 and S850, an operation of recognizing markings provided on the detected road is performed, and it may be determined whether or not a marking is recognized.

For example, the marking recognition processor 250 receives a second detection signal and a classifier signal, thereby recognizing markings displayed on the detected road.

If no marking is recognized, the process returns to step S811 in which the image data may be received again.

If a marking is recognized, the type of the recognize marking is classified using the selected classifier in step S860.

For example, the classifying processor 260 may receive a recognition signal, and may classify the type of the recognized marking according to the selected classifier.

As described above, according to the present disclosure, the present disclosure can provide a vehicle control system, a marking classifying device, and a marking classifying method, which can accurately recognize markings displayed on the road on which a vehicle is travelling, and can appropriately control the driving of the vehicle according to the recognized markings.

In addition, according to the present disclosure, the present disclosure can provide a vehicle control system, a marking classifying device, and a marking classifying method, which can correctly recognize markings that are specified differently between countries, thereby appropriately accelerating or braking the vehicle.

The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure. In addition, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A marking classifying device comprising:
    a road detector configured to receive image data to detect a road;
    a classifier selector configured to receive GPS signals to extract country information or region information and configured to select a classifier corresponding to the country information or the region information from among a plurality of classifiers; and
    a marking classifier configured to recognize a marking provided on the detected road and configured to classify a type of the recognized marking using the selected classifier.

2. The marking classifying device of claim 1, wherein the road detector adjusts a contrast of the image data by performing a contrast-stretching process on the received image data.

3. The marking classifying device of claim 1, wherein the road detector processes the received image data to detect a state of the road and outputs state information about the state of the road.

4. The marking classifying device of claim 3, wherein the marking classifier performs operations of identifying the state of the road indicated by the state information and, if the state of the road corresponds to a predetermined reference detection state, recognizing the marking.

5. The marking classifying device of claim 1, wherein if the recognized marking is a lane marking, the marking classifier further identifies a color of the lane marking and classifies a type of the lane marking by reflecting color information on the identified color.

6. A marking classifying method comprising:
    a road detection step of receiving image data to detect a road;
    a classifier selection step of receiving GPS signals to extract country information or region information and selecting a classifier corresponding to the country information or the region information from among a plurality of classifiers; and
    a marking classification step of recognizing a marking provided on the detected road and classifying a type of the recognized marking using the selected classifier.

7. The method of claim 6, wherein the road detection step comprises adjusting a contrast of the image data by performing a contrast-stretching process on the received image data.

8. The method of claim 6, wherein the road detection step comprises processing the received image data to detect a state of the road and outputting state information about the detected state of the road.

9. The method of claim 8, wherein the marking classification step comprises identifying the state of the road indicated by the state information and, if the state of the road corresponds to a predetermined reference detection state, recognizing the marking.

10. The method of claim 6, wherein the marking classification step comprises, if the recognized marking is a lane marking, further identifying a color of the lane marking and classifying a type of the lane marking by reflecting color information on the identified color.

11. A vehicle control system comprising:
    an image sensor mounted to a vehicle so as to have a field of view outside the vehicle and configured to capture image data;
    a communication module configured to receive GPS signals from GPS satellites;
    a marking classifying device configured to classify and store types of markings provided on a road based on the image data and the GPS signals; and
    a control device configured to detect a marking on a road on which the vehicle is travelling based on the image data, identify a type of the detected marking based on the type of marking stored in the marking classifying device, generate a control signal for controlling the driving of the vehicle based on the identified type of the marking, and output the control signal to an actuator, wherein the marking classifying device is configured to:

receive the image data to detect the road;

receive the GPS signals to extract country information or region information;

select a classifier corresponding to the country information or the region information from among a plurality of classifiers;

recognize the marking provided on the detected road; and classify the type of the recognized marking using the selected classifier.

* * * * *